US010443433B2

(12) United States Patent
Cataldi et al.

(10) Patent No.: US 10,443,433 B2
(45) Date of Patent: Oct. 15, 2019

(54) GAS TURBINE ROTOR COVER

(71) Applicant: ANSALDO ENERGIA SWITZERLAND AG, Baden (CH)

(72) Inventors: Giovanni Cataldi, Zürich (CH); Mauro Corradi, Wettingen (CH); Meisam Sistaninia, Brugg (CH); Martin Schaefer, Oberrohrdorf (CH); Tobias Herzog, Baden (CH)

(73) Assignee: ANSALDO ENERGIA SWITZERLAND AG, Baden (SE)

( * ) Notice: Subject to any disclaimer, the term of this patent is extended or adjusted under 35 U.S.C. 154(b) by 381 days.

(21) Appl. No.: 15/259,555

(22) Filed: Sep. 8, 2016

(65) Prior Publication Data
US 2017/0067362 A1 Mar. 9, 2017

(30) Foreign Application Priority Data
Sep. 8, 2015 (EP) .................................... 15184277

(51) Int. Cl.
*F01D 25/08* (2006.01)
*F02C 3/04* (2006.01)
(Continued)

(52) U.S. Cl.
CPC .............. *F01D 25/08* (2013.01); *F01D 11/18* (2013.01); *F01D 25/145* (2013.01); *F01D 25/24* (2013.01);
(Continued)

(58) Field of Classification Search
CPC ........ F01D 25/08; F01D 25/24; F01D 25/145; F01D 11/18; F02C 3/04; F05D 2240/35; F05D 2220/32; F05D 2260/231
(Continued)

(56) References Cited

U.S. PATENT DOCUMENTS 2,719,099 A * 9/1955 Holbrook .................. F02C 7/24
138/149
3,167,914 A * 2/1965 Savonuzzi .............. F02C 3/103
60/39.512
(Continued)

FOREIGN PATENT DOCUMENTS

EP 0374603 A1 * 6/1990 ............. F01D 9/026
EP 2592240 A1 * 5/2013 ........... F01D 25/145
(Continued)

OTHER PUBLICATIONS

Extended European Search Report dated May 2, 2016, by the European Patent Office in corresponding European Patent Application No. 15184277.0.

*Primary Examiner* — J. Todd Newton
(74) *Attorney, Agent, or Firm* — Buchanan Ingersoll & Rooney PC (57) ABSTRACT

A gas turbine rotor cover includes a body, the body having an inner side facing towards a central axis and an outer side facing away from the central axis, wherein the gas turbine rotor cover is configured and arranged to extend in an axial direction and a circumferential direction relative to the central axis. An inner layer of insulation is attached to the inner side of the body and extends along at least part of the length of the body in the axial direction and/or an outer layer of insulation is attached to the outer side of the body, and extends along at least part of the length of the body in the axial direction. A gas turbine containing the gas turbine rotor cover is also disclosed.

18 Claims, 4 Drawing Sheets

(51) Int. Cl.
  *F01D 11/18* (2006.01)
  *F01D 25/14* (2006.01)
  *F01D 25/24* (2006.01)
(52) U.S. Cl.
  CPC ............ *F02C 3/04* (2013.01); *F05D 2220/32* (2013.01); *F05D 2240/35* (2013.01); *F05D 2260/231* (2013.01)
(58) Field of Classification Search
  USPC ........................................................ 415/178
  See application file for complete search history.

(56) References Cited

U.S. PATENT DOCUMENTS

| | | | | |
|---|---|---|---|---|
| 3,196,611 A * | 7/1965 | Henny | ................... | F01D 17/162 60/39.512 |
| 3,304,054 A * | 2/1967 | Oechslin | ................ | F01D 25/14 415/134 |
| 3,949,552 A * | 4/1976 | Kaneko | ..................... | F01N 3/26 60/282 |
| 4,083,180 A * | 4/1978 | Thompson | ................ | F02C 7/24 415/177 |
| 4,101,242 A * | 7/1978 | Coplin | ..................... | F01D 11/18 415/134 |
| 4,118,927 A * | 10/1978 | Kronogard | ................ | F02C 7/36 60/39.163 |
| 4,300,349 A * | 11/1981 | Heckel | ..................... | F02C 7/24 415/197 |
| 4,405,284 A * | 9/1983 | Albrecht | ................... | C23C 4/02 415/173.4 |
| 4,522,559 A * | 6/1985 | Burge | ..................... | F01D 25/26 415/138 |
| 4,592,204 A * | 6/1986 | Rice | ........................ | F01D 5/185 60/39.17 |
| 5,605,438 A * | 2/1997 | Burdgick | ............. | F01D 25/145 415/182.1 |
| 5,662,457 A * | 9/1997 | Bechtel | ................. | F01D 25/145 415/135 |
| 6,220,234 B1 * | 4/2001 | Baker | ...................... | F02C 7/04 29/888.02 |
| 6,315,520 B1 * | 11/2001 | Haje | ......................... | B22C 9/10 415/178 |
| 6,786,052 B2 * | 9/2004 | Doody | .................. | F01D 25/145 415/177 |
| 6,997,672 B2 * | 2/2006 | Wand | ..................... | F01D 9/026 415/1 |
| 7,070,387 B2 * | 7/2006 | Crozet | .................... | F01D 11/24 415/173.1 |
| 8,225,615 B2 * | 7/2012 | Isomura | ................... | F02C 3/05 60/722 |
| 9,498,850 B2 * | 11/2016 | Denis | .................... | B23K 31/02 |
| 9,841,033 B2 * | 12/2017 | Henke | .................. | F04D 29/582 |
| 2004/0109758 A1 * | 6/2004 | Doody | .................. | F01D 25/145 415/177 |
| 2005/0120719 A1 * | 6/2005 | Olsen | ........................ | F01D 1/08 60/805 |
| 2006/0260292 A1 * | 11/2006 | Tanioka | ................. | F01D 5/288 60/39.511 |
| 2013/0051995 A1 * | 2/2013 | Wiebe | .................... | F01D 25/26 415/178 |
| 2014/0161601 A1 * | 6/2014 | Geiger | ................... | F01D 5/005 415/200 |
| 2016/0003098 A1 * | 1/2016 | Schwarz | .................. | F02C 7/24 415/122.1 |
| 2016/0084110 A1 * | 3/2016 | Giachetti | ............. | F01D 25/145 415/1 |
| 2016/0290160 A1 * | 10/2016 | Ettler | ................... | F01D 25/145 |

FOREIGN PATENT DOCUMENTS

| | | | |
|---|---|---|---|
| EP | 2957729 A1 * | 12/2015 | ............ F01D 25/24 |
| GB | 1 367 536 A | 9/1974 | |

* cited by examiner

GAS TURBINE ROTOR COVER

TECHNICAL FIELD

The present disclosure relates to gas turbine rotor covers, and particularly insulated gas turbine rotor covers.

BACKGROUND OF THE INVENTION

Gas turbines are subjected to extremes of temperature, resulting in significant amounts of thermal expansion and contraction during a typical gas turbine operation cycle, for example during start-up, cool-down or transition phases. The various parts of a gas turbine tend to change temperature at different rates, due to factors such as size, surface area and level of exposure to hot gases or cooling air. This can cause significant differences in expansion/contraction of adjacent components, and in such circumstances providing a good seal between adjacent components can be a major challenge. One particular area where differing thermal expansion and contraction rates can cause problems is around the first vane of the turbine section of a gas turbine.

SUMMARY OF THE INVENTION

A first aspect provides a gas turbine rotor cover comprising a body, the body comprising an inner side facing towards a central axis and an outer side facing away from the central axis, wherein the gas turbine rotor cover is configured and arranged to extend in an axial direction and a circumferential direction relative to the central axis, and wherein an inner layer of insulation (30) is attached to the inner side of the body and extends along at least part of the length of the body in the axial direction and/or an outer layer of insulation (40) is attached to the outer side of the body, and extends along at least part of the length of the body in the axial direction. Providing an insulated rotor cover of this type can reduce the speed that the rotor cover heats up/cools down compared to existing gas turbines, which can reduce movement of the rotor cover relative to the turbine vane carrier (or relative to other engine parts that contribute to determining the position of the turbine inlet parts). In turn, this can make it easier to seal gaps around the first vane 66, such as the gap between the first vane 66 and the combustor sequential liner 74 (or other engine parts delimiting the main hot gas path 84 upstream of the turbine).

Inner and/or outer layers of insulation may be provided. There are several circumstances in which insulation on only one side of the rotor cover may be appropriate. One example is when the cooling air flow is externally cooled to a temperature significantly lower than the compressor outlet temperature (e.g. 200 K lower). Another example is when the rotor cover main shell that carries the axial load of the turbine vane 1 is shielded from the turbine blade 1 cooling air by means of an inner shell and the air in the gap between a main shell and the inner shell is kept essentially stagnant. A third example is when the cooling air flow to blade 1 is passed inside of the rotor and the flow between the rotor and the rotor cover is minimal.

It is important to seal the gap between vane 1 and the sequential liner, specifically the sequential liner (transition piece) picture frame. The lifetime and type of seal to be chosen for this location can depend on the size of the gap between the parts and the evolution over time of the size of the gap during gas turbine operation (the higher the movement range, the more challenging it gets to design a robust seal). The size of the gap between vane 1 and the picture frame can be directly linked to the relative movements between rotor cover and turbine vane carrier, and some of the relative movement between the rotor cover and the turbine vane carrier is caused by the difference in thermal time constant between the inner casings (e.g. the rotor cover) and the outer casings (e.g. the outer housing). With the above arrangement, it is possible to reduce the relative movement (and to make it easier to seal the gap between vane 1 and the picture frame) by synchronising (or at least reducing the difference between) the thermal time constant of the rotor cover and the thermal time constant of the outer casings. This can be done by adding insulation on the rotor cover.

In one embodiment, the gas turbine rotor cover is configured and arranged to overlap (at least partially) with a diffuser in the axial direction when installed in a gas turbine comprising said diffuser.

In one embodiment, at least one of the inner and/or outer layers of insulation extend only on a portion of the gas turbine rotor cover that does not overlap with said diffuser in the axial direction. This can help ensure uniform radial temperature distribution through the rotor cover and can thereby increase rotor cover lifetime.

In one embodiment, the gas turbine rotor cover comprises an outer layer of insulation that is configured and arranged to overlap with said diffuser in the axial direction, and wherein at least part of the outer layer of insulation on the section of the outer layer of insulation that overlaps with said diffuser comprises a thermal barrier coating.

In one embodiment, at least one of the inner layer of insulation and/or the outer layer of insulation is at least 10 mm thick in a radial direction relative to the central axis.

A second aspect provides a gas turbine comprising a gas turbine rotor cover as described above.

In one embodiment the gas turbine comprises a compressor, a combustor downstream of the compressor, a turbine downstream of the combustor, and a rotor extending from the compressor to the turbine, wherein the gas turbine rotor cover extends between the compressor and the turbine in the axial direction and extends around at least part of the rotor in a circumferential direction relative to the central axis.

In one embodiment, the gas turbine comprises an outer housing extending around at least part of the gas turbine, wherein the gas turbine rotor cover is supported at least in the axial direction (at least axially supported) by the outer housing (for example by being attached directly or indirectly to or being adjacent to the outer housing).

In one embodiment, the turbine comprises a first vane and wherein the first vane is supported at least in the axial direction by the gas turbine rotor cover. The support may either be direct or indirect via another part of the gas turbine.

In one embodiment the gas turbine comprises a diffuser downstream of the compressor and at least one of the inner layer of insulation and the outer layer of insulation extend only on a portion of the gas turbine rotor cover that does not overlap with the diffuser in the axial direction.

In one embodiment, a thermal barrier coating is applied on at least part of the axial diffuser, preferably at least the part of the diffuser facing the rotor cover.

In one embodiment, the radial thickness and axial extension of the first and/or second layers of insulation are configured and arranged so as to minimise movement of the first vane relative to a sequential liner by balancing the thermal time constant of the rotor cover with the thermal time constant of the outer housing.

BRIEF DESCRIPTION OF THE DRAWINGS

An embodiment of the invention will now be described by way of example only and with reference to the accompanying drawings in which.

DETAILED DESCRIPTION OF THE PREFERRED EMBODIMENTS

Figure 1:
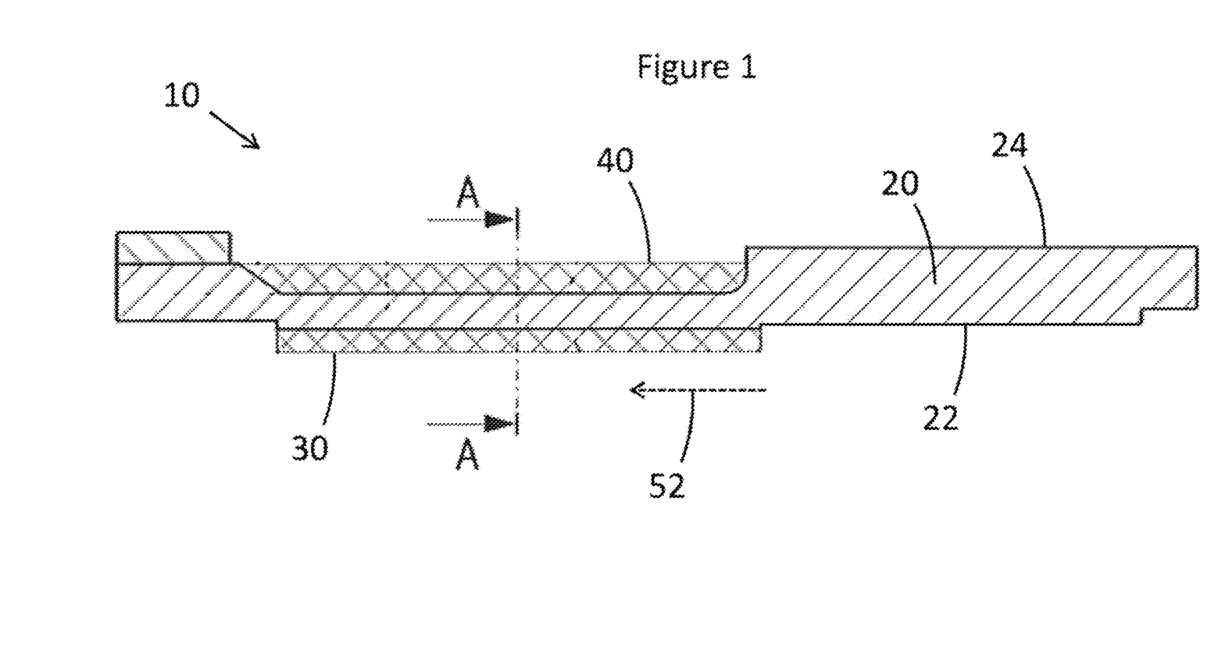
FIG. 1 shows a cross section of a gas turbine rotor cover.

FIG. 1 shows a rotor cover 10 (gas turbine rotor cover). The rotor cover 10 comprises a body 20 with an inner side 22 facing towards a central axis 50 (see FIG. 2) and an outer side 24 facing away from the central axis 50. The central axis 50 is also the gas turbine rotor axis when the rotor cover is installed in a gas turbine (see FIG. 3). The rotor cover 10 also comprises a first (inner) layer of insulation (thermal insulation) 30 on the inner side 22 and a second (outer) layer of insulation (thermal insulation) 40 on the outer side 24.

Figure 2:
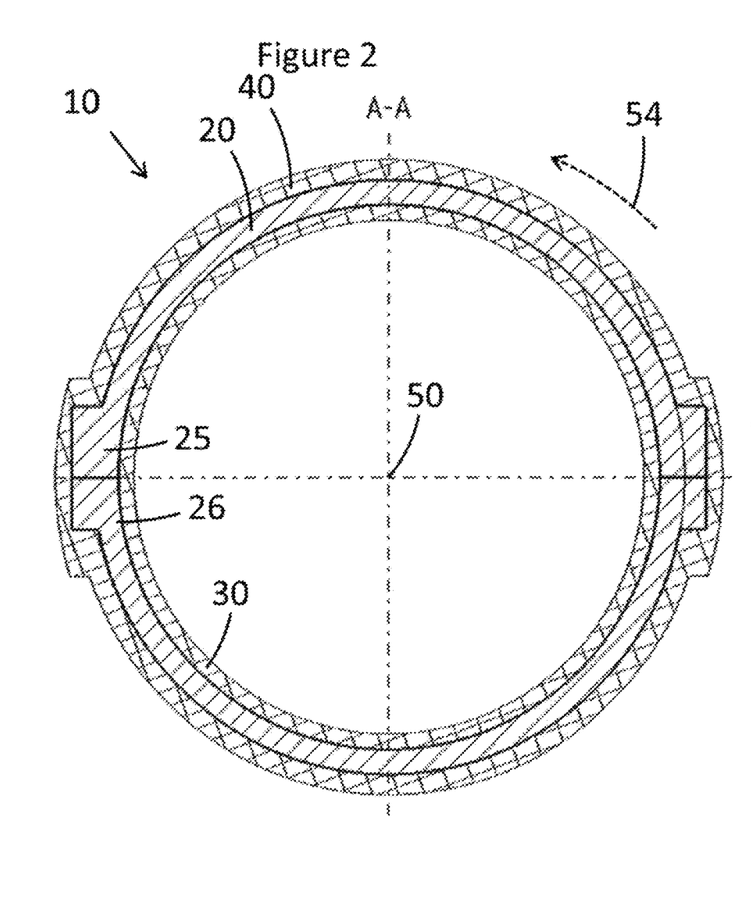
FIG. 2 shows a cross section of the gas turbine rotor cover of FIG. 1 along A-A.

FIG. 2 shows a cross section of the rotor cover 10 along A-A. From FIGS. 1 and 2, it can be seen that the rotor cover 10 extends in an axial direction 52 (FIG. 1) and in a circumferential direction 54 (FIG. 2). In FIG. 2 it can also be seen that the body 20 can be split into two halves, which in this example are an upper half 25 and a lower half 26 with a horizontal split plane.

Figure 3:
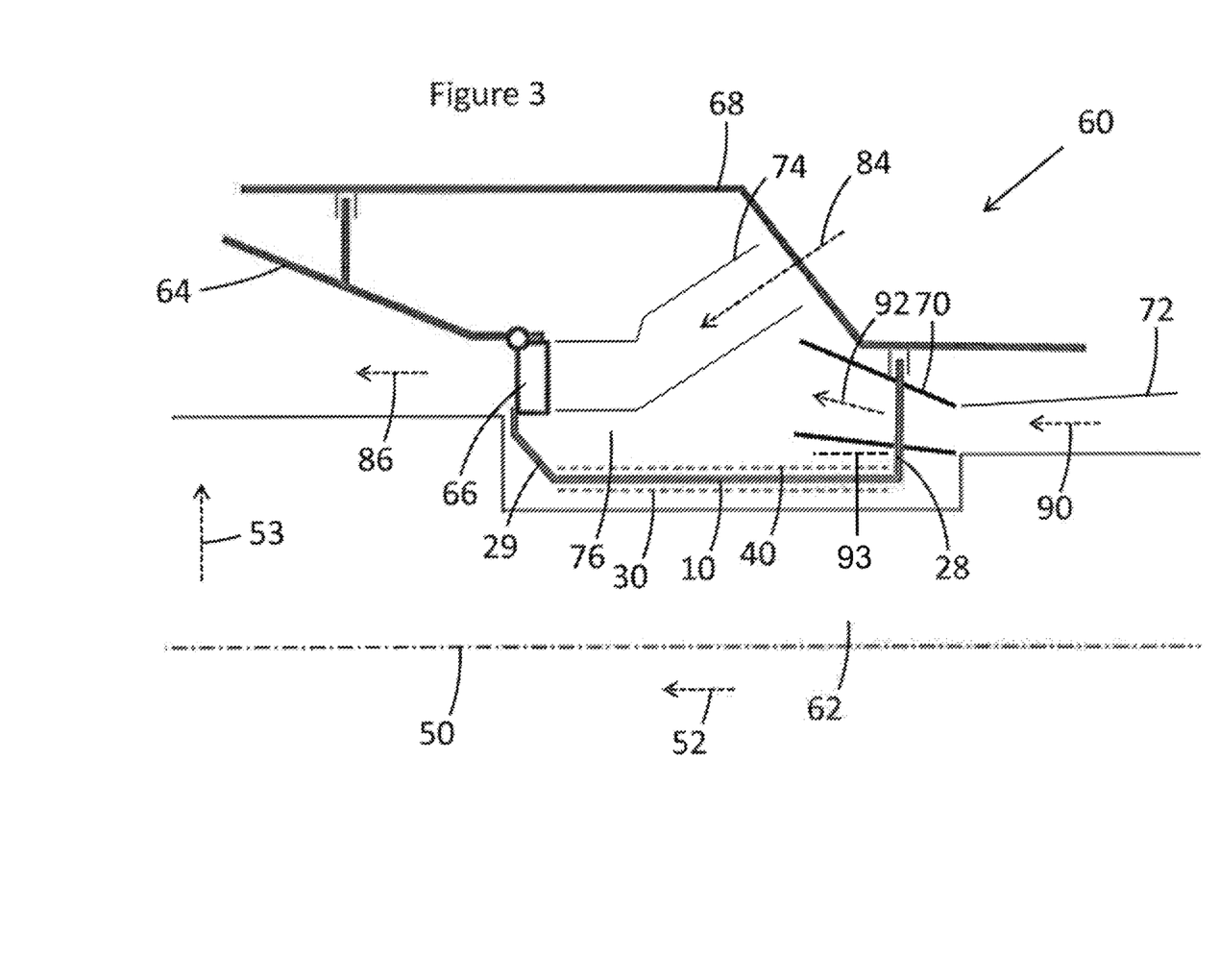
FIG. 3 shows a cross section of a gas turbine with a gas turbine rotor cover.

FIG. 3 shows a rotor cover 10 with insulation 30, 40 in a gas turbine 60. The gas turbine comprises a rotor 62, a turbine comprising a turbine vane carrier 64, a first vane 66, a turbine housing 68 (outer housing), a diffuser 70, a compressor 72 and a combustor comprising a sequential liner 74 and a combustion chamber (not shown) upstream of the sequential liner.

The rotor cover 10 extends around the rotor 62 between the rotor 62 and the combustor (the sequential liner 74 in particular). The rotor cover 10 is typically supported by the turbine housing 68 via a support 28. The rotor cover typically supports the first vane 66 via a support 29. The sequential liner 74 is typically covered with a thermal barrier coating on its hot gas side (the side exposed to exhaust gas 84), but not on the other side (the side exposed to fluid 92).

As shown in FIG. 3, the rotor cover 10 may extend beyond the design shown in FIG. 1 with one or more supports 28 attached to or in contact with other gas turbine components. Normally insulation would only be provided on the axially extending portion (the portion shown in FIG. 1).

Figure 4:
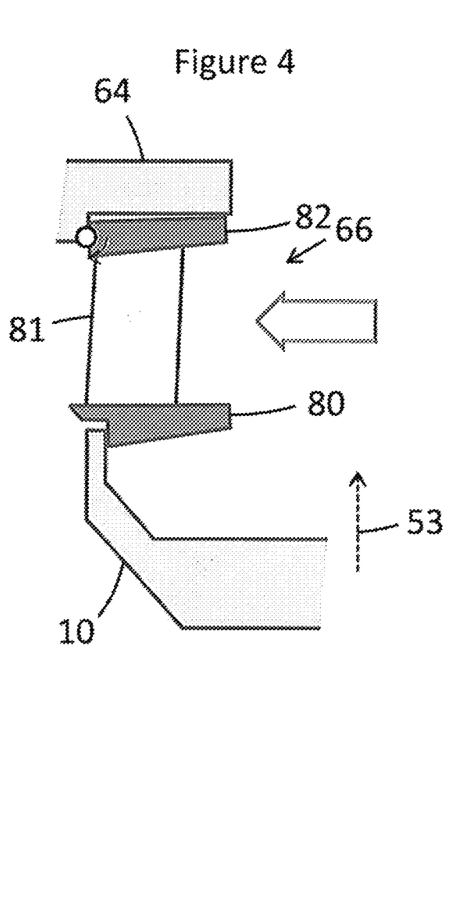
FIG. 4 shows a cross section of the area around a first vane of a gas turbine such as that shown in FIG. 3.

FIG. 4 shows further detail of a first vane 66, with the first vane 66 comprising an inner platform 80 adjacent to the rotor cover 10, an aerofoil 81 attached to the inner platform at an inner end of the aerofoil and an outer platform attached to an outer end of the aerofoil and pivotably attached to the turbine vane carrier 64 (or to a housing attached to the turbine vane carrier). The inner platform is closer to the rotor axis 50 than the outer platform.

The invention is particularly applicable to gas turbines with a first vane 66 (vane 1) with a "rocking" design such as that shown in FIG. 4, where vane 1 is axially supported at both its inner platform 80 (at the inner diameter) and its outer platform 82 (at the outer diameter) and is radially supported at the outer platform 82. As a result, vane 1 tends to rotate (rock) during transient operation due to thermal expansion of components. In particular, the rotor casing 10 and the turbine vane carrier 64 normally cool down and heat up faster than the turbine housing 68 (to which the rotor casing is normally attached by support 28), resulting in movement of the rotor casing and the turbine vane carrier relative to one another. Rapid heating of the rotor cover is also due in some circumstances to the flow of hot compressor discharge air past the rotor cover, which can result in high heat transfer.

Providing an insulated rotor cover as described herein can reduce the speed that the rotor cover heats up/cools down, which can reduce movement of various components relative to one another. For example, movement of the rotor cover relative to other components such as the turbine vane carrier, the outer housing and the sequential liner may be reduced. Movement of the turbine vane carrier and vane 1 may also be reduced relative to components such as the outer housing and the sequential liner. In particular, reduced movement can make it easier to seal gaps around the first vane 66, such as the gap between the first vane 66 (specifically inner platform 80) and the sequential liner 74.

Figure 5:
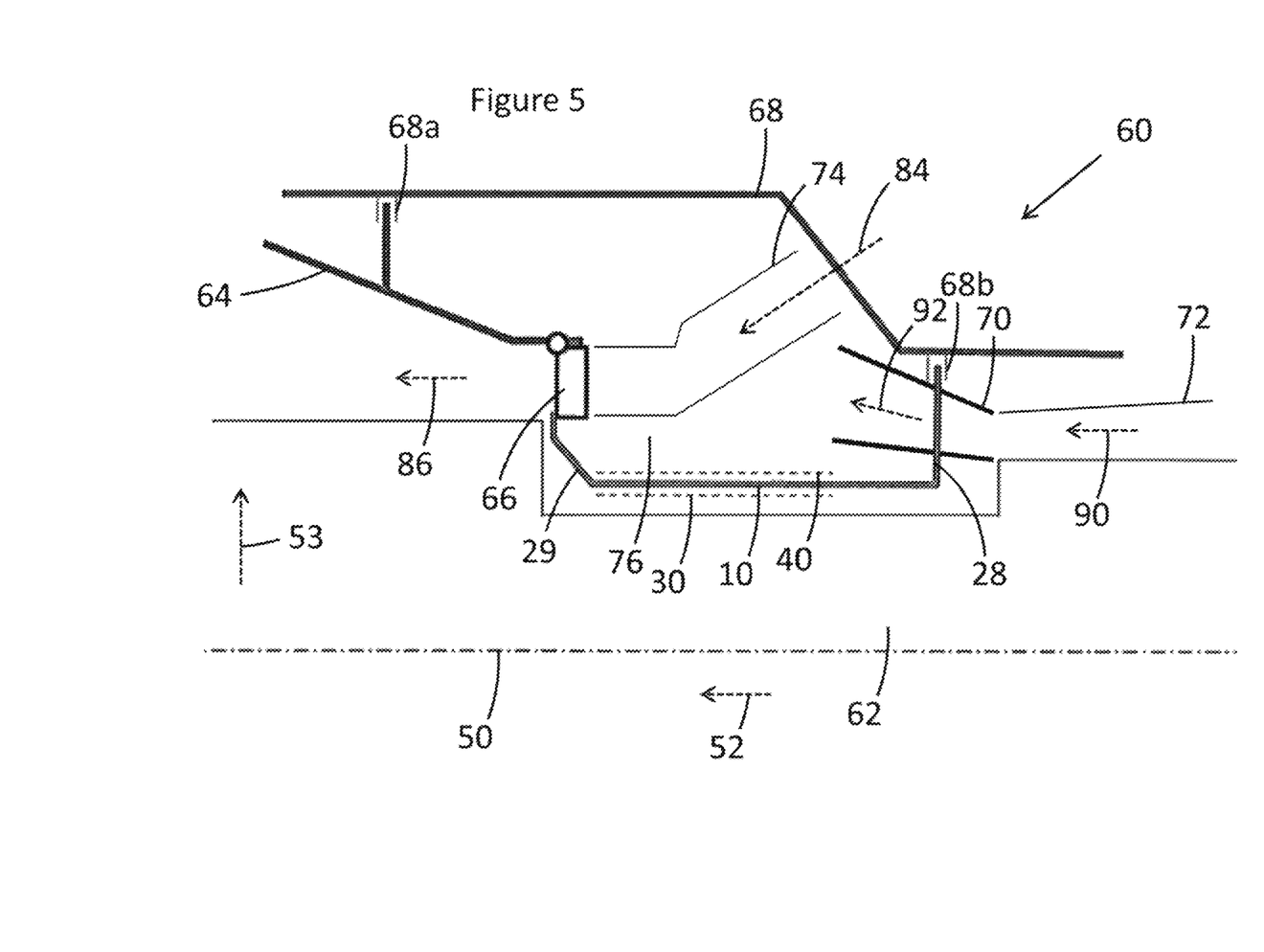
FIG. 5 shows a cross section of a gas turbine with an alternative gas turbine rotor cover.

FIG. 5 shows a gas turbine 60 similar to that shown in FIG. 3. In FIG. 3, the insulation 30, 40 on the rotor cover 10 extends the full length of the axial section of the rotor cover. In FIG. 5, in contrast, the rotor cover 10 is only insulated on the portion that is not adjacent to the diffuser; that is, the insulation is not at the same point in the axial direction 52 as the diffuser (does not overlap, or is spaced apart in the axial direction 52 from the diffuser). This is also the portion of the rotor cover 10 that is downstream of the diffuser 70 relative to the direction of flow of the fluid 92. The portion of the rotor cover adjacent to the diffuser is therefore not insulated in some embodiments. In some embodiments the opposite is also possible, with insulation only on the portion of the rotor cover adjacent to the diffuser.

FIG. 5 also shows a turbine vane cover axial support 68a for supporting the turbine vane carrier 64 and a rotor cover axial support 68b for supporting the rotor cover 10, both on the outer housing 68.

When the gas turbine 60 is in use, a fluid 90 such as air is compressed in a compressor upstream of the sequential liner, after which the fluid 92 moves through the diffuser and into the cavity 76 around the sequential liner 74. Some of this air is mixed with fuel and combusted in the combustion chamber, after which the resulting exhaust gases 84 from the combustion chamber pass through the sequential liner 74 and past the first vane 66. The exhaust gases 86 then pass through the turbine.

During operation of a gas turbine 60, the gas turbine typically starts up and then runs in an operating state (e.g. base load) or transitions between various operating states before being shut down.

During the design phase, the rotor cover can be optimised by choosing the radial thickness and axial extension of the first and/or second layers of insulation so as to minimise relative movement, for example of vane 1 relative to a sequential liner, by balancing the thermal time constant of the rotor cover (10) with the thermal time constant of one or more other gas turbine components, such as the outer housing (10) or the turbine vane carrier (64). The thermal time constant gives an indication of the rate of change of temperature of a given component or part when subjected to a change in the temperature of its surroundings.

The rotor cover 10 (and by extension the body 20 and the insulation 30, 40) is typically cylindrical and is typically made up of a plurality of segments in the axial direction 52 and/or the circumferential direction 54. The insulation and the body may be detachable from one another and segmented separately. For example, the body may be split into a first half and a second half in the circumferential direction (such as upper half 25 and lower half 26), and the insulation may also be in separate sectors in the circumferential direction 54. For example, the outer side insulation 40 may be made of four separate sectors, and the inner side insulation 30 may be made of two separate sectors.

The segments of the body 20 (for example the upper half 25 and the lower half 26) may be attached to each other in a variety of ways, including bolting or welding. The upper half 25 and the lower half 26 are normally attached by a removable attachment means such as bolting, to allow removal during maintenance. Adjacent insulation sectors may overlap one another, especially in the area of the rotor cover split plane (e.g. the horizontal plane in FIG. 2); this can help minimise leakage.

Along with this, the insulation and particularly the outer side insulation 40 may be removably attached to the body. This can allow for removal of the outer side insulation to dismantle the rotor cover during maintenance. Insulation sectors that cover the attachment point between the upper half 25 and the lower half 26 can be removable to allow access to the attachment means (e.g. bolts) holding the upper half 25 and the lower half 26 together.

The rotor cover may comprise a thermal barrier coating 93, for example on portions of the body that are not insulated and/or on one or more of the inner and outer layers of insulation; preferably, the thermal barrier coating 93 is at least 1.0 mm thick, more preferably between 1.0 mm and 10 mm thick.

In FIG. 1, the insulation 30, 40 extends only part of the way along the rotor cover 10 in the axial direction 52. In FIG. 4, the insulation 30, 40 is shown extending along almost the full extent of the rotor cover in the axial direction 52. Various different combinations are possible, and the insulation on the inner side does not have to have the same extent as the insulation on the outer side. For example, the inner side insulation 30 may only extend up to the diffuser in the axial direction 52, with the outer side insulation 40 extending most or all of the length of the rotor cover 10 in the axial direction 52. Where insulation only extends part of the way along the rotor cover, the body may be split into segments with a join between segments at the point where the insulation ends.

The inner side insulation is normally closer to the rotor axis than the outer side insulation. In FIG. 1, the inner side insulation 30 is shown as being attached on the body 20, whereas the outer side insulation 40 is shown as being placed in a recess in the body 20. Other configurations are possible, with neither the inner side and outer side insulation 30, 40 being in a recess, or with part or all none of one or both of the inner side and outer side insulation 30, 40 being in a recess.

In a design phase, the thickness of the insulation in the radial direction 53 can be chosen based on the expected heating and cooling rates of the rotor cover 10 and other selected relevant components, such as the outer housing and the turbine vane carrier. In one example, the insulation is at least 10 mm thick, for example between 10 and 100 mm or between 25 and 75 mm thick. The inner side insulation and the outer side insulation may be different thicknesses, and may also vary in thickness in different places on the rotor cover.

The insulation is designed to slow down the heating and cooling rate of the rotor cover. Preferably, the insulation slows down the heating and cooling rate (the heat transfer coefficient) of the rotor cover 10 by a factor of at least 5 compared to the same rotor cover without insulation.

The combustor may be of a can, annular or cannular type, for example. The gas turbine 60 in FIG. 3 is merely given as an example, and is not intended to imply that all the components in FIG. 3 are required or that all the components always have the shape and position shown.

The first vane can be supported in various ways other than by the turbine vane carrier, for example by the outer housing or by an intermediate component attached to the turbine vane carrier, the outer housing or another gas turbine component. In FIG. 4 the first vane 66 is shown as pivotably attached to the turbine vane carrier 64 and adjacent to the rotor cover 10 (specifically support 29), but the first vane 66 may alternatively be pivotably attached in a different way, for example to the rotor cover 10 and adjacent to the turbine vane carrier 64. In this case, the gap that is most difficult to seal tends to be the gap between the outer diameter of the first vane and the combustor sequential liner.

Various modifications to the embodiments described are possible and will occur to those skilled in the art without departing from the invention which is defined by the following claims.

| REFERENCE NUMERALS | |
|---|---|
| 10 | rotor cover (gas turbine rotor cover) |
| 20 | body |
| 22 | inner side |
| 24 | outer side |
| 25 | upper half |
| 26 | lower half |
| 28 | support |
| 29 | support |
| 30 | inner (first) side (thermal) insulation |
| 40 | outer (second) side (thermal) insulation |
| 50 | central axis/gas turbine rotor axis |
| 52 | axial direction |
| 53 | radial direction |
| 54 | circumferential direction |
| 60 | gas turbine |
| 62 | rotor |
| 64 | turbine vane carrier (cover) |
| 66 | first vane |
| 68 | turbine housing (outer housing) |
| 68a | turbine vane carrier axial support |
| 68b | rotor cover axial support |
| 70 | diffuser |
| 72 | compressor |
| 74 | sequential liner |
| 76 | cavity |
| 80 | inner platform |
| 81 | aerofoil |
| 82 | outer platform |
| 84 | exhaust gases |
| 86 | exhaust gases |
| 90 | fluid |
| 92 | fluid |
| 93 | thermal barrier coating |

The invention claimed is:

1. A gas turbine rotor cover comprising:
   a body, the body having an inner side configured to face towards a rotor central axis and an outer side configured to face away from the rotor central axis, wherein the gas turbine rotor cover is configured to extend in a rotor axial direction and a circumferential direction relative to the rotor central axis;
   a diffuser;
   an inner layer of thermal insulation attached to the inner side of the body which, extends along at least part of a length of the body in the rotor axial direction;
   an outer layer of thermal insulation attached to the outer side of the body, which extends along at least part of the length of the body in the rotor axial direction; and
   the outer layer of thermal insulation is configured to overlap with the diffuser in the rotor axial direction, and wherein at least part of the outer layer of thermal insulation configured to overlap with the diffuser includes a thermal barrier coating.

2. The gas turbine rotor cover of claim 1, wherein the gas turbine rotor cover is configured to overlap with the diffuser in the rotor axial direction when installed in a gas turbine having the diffuser.

3. The gas turbine rotor cover of claim 1, wherein at least one of the inner and/or outer layers of thermal insulation extend only on a portion of the gas turbine rotor cover that is configured to not overlap with the diffuser in the rotor axial direction.

4. The gas turbine rotor cover of claim 1, wherein at least one of the inner layer of thermal insulation and/or the outer layer of thermal insulation is at least 10 mm thick in a radial direction relative to the rotor central axis.

5. A gas turbine comprising the gas turbine rotor cover according to claim 1.

6. The gas turbine of claim 5, comprising:
   a compressor, a combustor downstream of the compressor;
   a turbine downstream of the combustor; and
   a rotor extending from the compressor to the turbine, wherein the gas turbine rotor cover extends between the compressor and the turbine in the rotor axial direction and extends around at least part of the rotor in a circumferential direction relative to the rotor central axis.

7. The gas turbine of claim 6, comprising:
   an outer housing extending around at least part of the gas turbine, wherein the gas turbine rotor cover is supported in least in the rotor axial direction by the outer housing.

8. The gas turbine of claim 6, wherein the turbine comprises:
   a first vane, wherein the first vane is supported at least in the rotor axial direction by the gas turbine rotor cover.

9. The gas turbine of claim 8, wherein a radial thickness and an axial extension of the first and/or second layers of thermal insulation are configured and arranged so as to minimise movement of the first vane relative to a sequential liner by balancing a thermal time constant of the rotor cover with a thermal time constant of the outer housing.

10. The gas turbine of claim 6, wherein the gas turbine comprises:
    the diffuser downstream of the compressor, and at least one of the inner layer of thermal insulation and the outer layer of thermal insulation extend only on a portion of the gas turbine rotor cover that does not overlap with the diffuser in the rotor axial direction.

11. The gas turbine of claim 10 comprising:
    a thermal barrier coating applied on at least part of the axial diffuser.

12. A gas turbine rotor cover comprising:
    a body, the body having an inner side configured to face towards a rotor central axis and an outer side configured to face away from the rotor central axis, wherein the gas turbine rotor cover is configured to extend in a rotor axial direction and a circumferential direction relative to the rotor central axis; and
    an outer layer of thermal insulation attached to the outer side of the body, which extends along at least part of the length of the body in the rotor axial direction,
    wherein the gas turbine rotor cover is configured to overlap with a diffuser in the rotor axial direction when installed in a gas turbine having the diffuser,
    wherein the outer layer of thermal insulation is configured to overlap with the diffuser in the rotor axial direction, and at least part of the outer layer of thermal insulation configured to overlap with the diffuser includes a thermal barrier coating.

13. The gas turbine rotor cover of claim 12, wherein the outer layer of thermal insulation is at least 10 mm thick in a radial direction relative to the rotor central axis.

14. A gas turbine comprising:
    a compressor;
    a combustor downstream of the compressor;
    a turbine downstream of the combustor;
    a rotor extending from the compressor to the turbine;
    a gas turbine rotor cover extends between the compressor and the turbine in a rotor axial direction and extends around at least part of the rotor in a circumferential direction relative to a rotor central axis, the gas turbine rotor cover including,
    a body, the body having an inner side configured to face towards the rotor central axis and an outer side configured to face away from the rotor central axis, wherein the gas turbine rotor cover is configured to extend in the rotor axial direction and the circumferential direction relative to the rotor central axis, an inner layer of thermal insulation attached to the inner side of the body which, extends along at least part of a length of the body in the rotor axial direction, and an outer layer of thermal insulation attached to the outer side of the body, which extends along at least part of the length of the body in the rotor axial direction;
    a diffuser; and
    an outer housing extending around at least part of the gas turbine, wherein the gas turbine rotor cover is supported in least in the rotor axial direction by the outer housing,
    wherein the outer layer of thermal insulation is configured to overlap with the diffuser in the rotor axial direction, and wherein at least part of the outer layer of thermal insulation configured to overlap with the diffuser includes a thermal barrier coating.

15. The gas turbine of claim 14, wherein the turbine comprises:
    a first vane, wherein the first vane is supported at least in the rotor axial direction by the gas turbine rotor cover.

16. The gas turbine of claim 15, wherein a radial thickness and an axial extension of the first and/or second layers of thermal insulation are configured to minimise movement of the first vane relative to a sequential liner by balancing a thermal time constant of the rotor cover with a thermal time constant of the outer housing.

17. The gas turbine of claim 14 comprising:
a diffuser downstream of the compressor, and at least one of the inner layer of thermal insulation and the outer layer of thermal insulation extend only on a portion of the gas turbine rotor cover that does not overlap with the diffuser in the rotor axial direction.

18. The gas turbine of claim 17 comprising:
a thermal barrier coating applied on at least part of the diffuser.

* * * * *